Feb. 21, 1961   C. M. TOWNSEND   2,972,162
MOUNTING OF LOAD-BEARING BALLS OR LOAD-BEARING ROLLERS
Filed Dec. 26, 1958
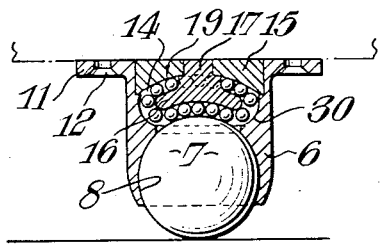
Fig. 1
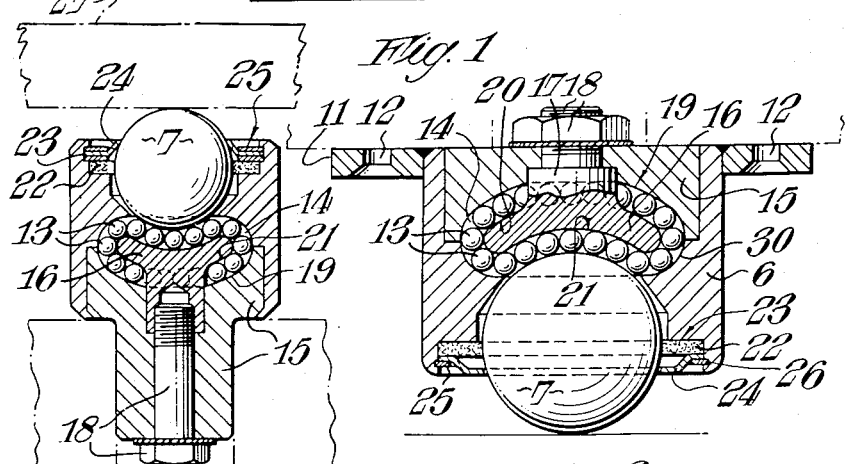
Fig. 2
Fig. 3
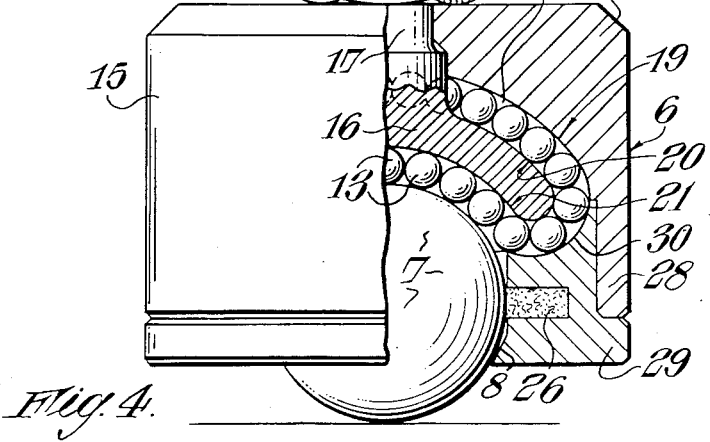
Fig. 4
INVENTOR
CLAUDE MORTIMER TOWNSEND
BY Kurt Kelman
his AGENT

United States Patent Office 2,972,162
Patented Feb. 21, 1961

2,972,162
MOUNTING OF LOAD-BEARING BALLS OR LOAD-BEARING ROLLERS

Claude Mortimer Townsend, Birmingham, England, assignor to Autoset (Production) Limited, Birmingham, England, a British company Filed Dec. 26, 1958, Ser. No. 783,063

2 Claims. (Cl. 16—26)

The application of load-bearing balls carried in a mounting is a familiar one in the case of ball-catches, and so-called ball castors. In the latter case, the load-carrying ball has in the past been supported in a mounting carrying a horizontally disposed ring of balls in contact with the upper part of the ball, a hemisphere of balls contacting its upper hemispherical portion. Both these expedients suffer from the disadvantage that, due to the load on the load-carrying ball being transmitted to the separate supporting balls, the latter were prevented from rotating as the load-carrying ball rotated, the latter in effect merely sliding over the supporting balls as it rotated. This led to rapid wear of the supporting balls, resulting in looseness developing between the load-carrying ball and the supporting balls, and furthermore to an increasing resistance to rotation of the load-carrying ball as the worn surfaces of the supporting balls increased in area with resulting increase in area of frictional contact and resistance.

It is an object of the said invention to provide a load-carrying ball mounting in which the said disadvantage is wholly or largely overcome.

According to the present invention, a mounting for a load-carrying ball has supporting ball-bearings provided in an endless track, a proportion only of the ball-bearings being adapted to be in rolling contact with the load-carrying ball at any given instant, each ball-bearing being able to circulate within the endless track as it rotates successively contacting the load-carrying ball, moving out of contact therewith, recirculating, returning into contact therewith, and so on as rotation of the load-carrying ball proceeds.

The supporting ball bearings (which are of smaller diameter than that of the load-carrying ball) as they rotate in their endless track thus provide a moving track of constantly changing point supports for the rotating load-carrying ball, thereby ensuring a virtually frictionless long-wearing mounting for the load-carrying ball.

The supporting ball bearings preferably contact the load-carrying ball over a portion of its periphery approximating to a hemisphere, the recirculating part of the endless track being disposed at both ends of and above the contacting part of the endless track.

The endless track is preferably provided by a substantially hemispherical recess in one end of a cylindrical member, the floor of the recess providing one wall of the recirculating part of the endless track, the outer wall of a hollow hemispherical partition spaced by slightly more than the diameter of a supporting ball from the said floor providing the other wall of the recirculating part, and the inner wall of the partition providing one wall of the contacting part of the endless track, the load carrying ball surface providing the other wall of the contacting part.

The said partition is preferably secured in its position in which it separates the two parts of the endless track, by a symmetrically disposed neck secured symmetrically to the said cylindrical member.

The said neck may be screwthreaded and be engaged in a screw threaded aperture disposed symmetrically in the floor of the said recess, the neck projecting from the remote end of the cylindrical member and serving for securing the assembly to an object, for example, a furniture leg. A spacing or bearing nut or washer may be screwed on to the said neck so as to be interposed between the cylindrical member and the said object.

The load-carrying ball mounting has unlimited application where a load needs to be translated in position. It can be applied in positions other than the downwardly disposed position familiar in the case of so-called ball castors, and is equally effective for all directions of loading or translatory movement. For example, it has application in the supporting of heavy plates required to be moved from place to place whilst lying flat, a plurality of load-carrying balls being secured with their exposed surfaces facing upwardly for carrying the plates. For normal use, steel load-carrying can be employed. For particular applications, for example the supporting of glass sheets, other materials can be employed for the load-carrying ball such as nylon or other suitable plastics.

For a better understanding of the invention, reference is made to the accompanying explanatory drawing which illustrates, by way of example, several forms of construction of load bearing balls according to the invention. In the drawing:

Fig. 1 is a vertical section of a load bearing ball according to the invention.

Fig. 2 is a vertical section similar to Fig. 1 of a modification.

Fig. 3 is a vertical section similar to Fig. 2 illustrating a modified use of the load ball.

Fig. 4 is a vertical sectional elevation of a further modification.

As will be observed in the drawing, there is provided a skid type load bearing ball comprising a mounting 6 for a ball member 7 which is mounted for rotation in a spherical mouth 8; the mounting 6 has an external attachment flange 11 provided with screw holes 12.

The mounting 6 has several supporting ball bearings 13 arranged in an endless track or race 14 above the ball member 7 and serving as a recirculating enclosure for the ball bearings 13.

The endless track 14 is provided by a substantially hemispherical recess provided between the inner end of a cylindrical member 15 and a hollow hemispherical partition 16 arranged centrally above the load ball 7 and carried by an axially disposed neck 17 which is symmetrically secured to the cylindrical member 15 by screw and nut clamping means 18. Figs. 2, 3 and 4.

The concave-convex partition 16 provides in combination with the cylindrical member 15 and the load ball 7 a two tier ball track or race in which the floor 19 of the recess provides one wall, and the outer wall 20 of the partition 16 the other wall of the recirculating part of the track, whereas the inner wall 21 of the partition 16 and the adjacent periphery of the load ball 7 respectively provides co-operative ball contacting parts of the endless track.

In the construction of Fig. 1, the load ball 7 is retained in the mounting 6 by the spherical bore thereof of which the mouth 8 serves to exclude dust. In Fig. 2, the mounting 6 is provided with a dust excluding washer 22 made of flexible material which embraces the load ball 7 and is held in a ring seating 23 by means of a ball retaining ring 24 backed up by a snap ring 25 engaging an annular groove 26 in the mounting 6.

In Fig. 3, the ball 7 of the load ball construction is illustrated as being inverted for use in supporting a heavy plate or a glass sheet 27 during translatory movement from place to place whilst lying flat, several such load balls being adapted to be arranged in a common plane with their exposed surfaces facing upwardly for effectively supporting the sheet 27. In this construction, a washer 22 is employed together with a ring seating 23 backed by a snap ring 25 substantially as described with reference to Fig. 2.

In the construction of Fig. 4, the ball mounting 6 provides the floor 19 of the said recess and the annular rim 28 receives a plug 29 formed with a spherical mouth 8, as in Fig. 1; this plug 29 is formed interiorly with a spherical seating 30 corresponding to that in Fig. 2 thereby to provide a part of the circulating track for the ball bearings 13. For particular applications, the load ball 7 may be made of nylon or of plastics instead of steel.

In all the forms of the construction illustrated, a proportion only of the ball bearings 13 are in rolling contact with the load ball 7 at any given instant, each ball 13 being able to circulate within the endless track 14 as it rotates, successively contacting the load ball 7, recirculating, returning into contact therewith and repeating the operation as rotation of the load ball 7 proceeds during the particular work the article has to perform. It will be appreciated that as the balls 13 rotate in their endless track, they provide a moving track of constantly changing point supports for the rotating load-carrying ball, thereby ensuring a virtually frictionless, long-wearing mounting for the load-carrying ball.

It will be observed that the ball bearings 13 contact the load-carrying ball 7 over a portion of its periphery approximating to a hemisphere, the recirculating part of the endless track 14 being disposed at both ends of and above the contacting part of the endless track.

In order to provide for an easy and ready movement of the ball bearings 13 in the endless track, the floor 19 will be spaced from the corresponding wall 20 slightly more than the diameter of the ball bearings 13.

The axial neck 17 on the partition 16 is formed as a cylindrical peg which engages a corresponding seating socket provided in the member 15 (Figs. 1–3), or in the corresponding part 15 forming the mounting 6 (Fig. 4). The peg and socket engagement has approximately 5 thousandths of an inch machined clearance fit in order that the partition 16 is permitted to have a limited rocking movement, whereby adequate clearance is provided for the recirculating motion of the balls 13 within the endless track 14. The said movement is also of advantage when the load ball 7 is under thrust and is urged in rubbing contact against the mouth 8 in a dust excluding manner.

In the application of the invention where unidirectional movements are required or desirable in industry, the load-carrying ball 7 may be substituted by a roller, the terms ball and roller being synonymous.

It will also be appreciated that the invention is not to be regarded as limited to the details of construction above described in connection with the examples, and that modifications may be made without departing from the basic ideas of the invention as defined in the appended claims.

I claim:

1. A load carrying ball comprising a load ball mounting having a central mouth and a central recess having a concave surface remote from said mouth, a load ball mounted for rotation in said mouth and having a portion projecting through said mouth to the exterior of said mounting, a central partition having concave and convex surfaces, the concave surface being symmetrical with the periphery of said ball and being spaced therefrom, said convex surface of the partition being symmetrical with the recess and thereby forming a two tier endless ball race therewith, several free circulating anti-friction balls in contact with said load ball and below the concave surface of said partition and several other free circulating anti-friction balls in contact with the convex surface of said partition and the recess of said mounting, a central socket in said mounting and a central peg at the head of said central partition and positioned in said socket, said peg and socket having a clearance fit whereby a rocking motion between said peg and said socket and movement of said anti-friction balls is permitted, whereby the supporting surfaces of said anti-friction balls are distributed between said surfaces of said partition, said concave surface of said recess of the mounting and the periphery of said load bearing ball.

2. A load carrying ball according to claim 1, and including an annular groove in said housing adjoining the said mouth, said groove housing a flexible dust excluding washer embracing said load ball and means for retaining said washer in its groove.

References Cited in the file of this patent

UNITED STATES PATENTS

| | | |
|---|---|---|
| 488,954 | Smith | Dec. 27, 1892 |
| 491,710 | Lennard | Feb. 14, 1893 |
| 985,455 | Russel | Feb. 28, 1911 |
| 1,311,477 | Weston | July 29, 1919 |

FOREIGN PATENTS

| | | |
|---|---|---|
| 2,853 | Great Britain | Feb. 4, 1898 |